United States Patent
Yoo et al.

(10) Patent No.: US 10,467,554 B2
(45) Date of Patent: Nov. 5, 2019

(54) SYSTEM FOR CONNECTING A DRIVER AND A RIDER

(71) Applicant: Lyft, Inc., San Francisco, CA (US)

(72) Inventors: Frank Taehyun Yoo, Cupertino, CA (US); Evan Goldin, San Francisco, CA (US); Sebastian Rolf Johan Brannstrom, San Francisco, CA (US); Eduardo Alfio Perez Rico, Redwood City, CA (US)

(73) Assignee: Lyft, Inc., San Francisco, CA (US)

( * ) Notice: Subject to any disclaimer, the term of this patent is extended or adjusted under 35 U.S.C. 154(b) by 321 days.

(21) Appl. No.: 13/828,913

(22) Filed: Mar. 14, 2013

(65) Prior Publication Data
US 2017/0193404 A1    Jul. 6, 2017

(51) Int. Cl.
*G06Q 10/02* (2012.01)
*H04W 4/02* (2018.01)
*H04W 4/024* (2018.01)
*G06Q 10/06* (2012.01)
*G06Q 20/32* (2012.01)

(52) U.S. Cl.
CPC ............ *G06Q 10/02* (2013.01); *G06Q 10/06* (2013.01); *G06Q 20/322* (2013.01); *H04W 4/023* (2013.01); *H04W 4/024* (2018.02); *H04W 4/025* (2013.01)

(58) Field of Classification Search
CPC .... G06Q 10/02; G06Q 10/06; G06Q 20/3224; G06Q 30/08; H04W 4/023; H04W 4/44; H04W 4/029; H04W 4/024
See application file for complete search history.

(56) References Cited

U.S. PATENT DOCUMENTS

| | | | |
|---|---|---|---|
| 6,356,838 B1 * | 3/2002 | Paul | ................... G01C 21/3453 701/410 |
| 8,126,903 B2 | 2/2012 | Lehmann | |
| 8,150,967 B2 * | 4/2012 | King | ..................... G01S 5/0027 709/224 |
| 9,165,074 B2 | 10/2015 | Hendrey | |
| 9,547,309 B2 | 1/2017 | Ross et al. | |
| 9,679,489 B2 | 6/2017 | Lambert et al. | |
| 9,769,616 B1 | 9/2017 | Pao et al. | |

(Continued)

FOREIGN PATENT DOCUMENTS

| | | |
|---|---|---|
| CN | 105045858 A | 11/2015 |
| EP | 2507753 A1 | 10/2013 |

(Continued)

OTHER PUBLICATIONS

U.S. Appl. No. 15/479,118, Jun. 28, 2017, Notice of Allowance.

(Continued)

*Primary Examiner* — George Chen
(74) *Attorney, Agent, or Firm* — Keller Jolley Preece

(57) ABSTRACT

A system for connecting a driver and a rider comprises a processor and an interface. The processor is configured to select a driver for a requested ride from the rider. The interface is configured to, in the event that the driver accepts the rider, provide a connect notification to the rider. The connect notification comprises an image associated with the driver, an image associated with the driver's car, and an anonymized interface for contacting the driver.

21 Claims, 17 Drawing Sheets

(56) References Cited

U.S. PATENT DOCUMENTS

| | | |
|---|---|---|
| 9,894,484 B1 | 2/2018 | Pao et al. |
| 10,091,618 B1 | 10/2018 | Pao et al. |
| 2004/0260470 A1* | 12/2004 | Rast ............................ 701/300 |
| 2005/0015307 A1* | 1/2005 | Simpson ........... G06F 17/30241 705/26.61 |
| 2006/0241862 A1 | 10/2006 | Ichihara et al. |
| 2009/0216600 A1* | 8/2009 | Hill .................................... 705/9 |
| 2010/0057502 A1 | 3/2010 | Arguelles et al. |
| 2010/0207812 A1* | 8/2010 | Demirdjian et al. .... 342/357.09 |
| 2011/0099040 A1 | 4/2011 | Felt et al. |
| 2011/0301985 A1 | 12/2011 | Camp et al. |
| 2011/0313880 A1* | 12/2011 | Paul ................... G06Q 30/0631 705/26.7 |
| 2012/0232943 A1 | 9/2012 | Myr |
| 2012/0265433 A1* | 10/2012 | Viola ................. G01C 21/3617 701/410 |
| 2012/0290652 A1 | 11/2012 | Boskovic |
| 2013/0132140 A1* | 5/2013 | Amin ..................... G06Q 10/02 705/7.13 |
| 2013/0246301 A1 | 9/2013 | Radhakrishnan et al. |
| 2014/0047381 A1 | 2/2014 | Fan et al. |
| 2014/0062886 A1* | 3/2014 | Pasquero ............... G06F 3/0237 345/168 |
| 2014/0129302 A1 | 5/2014 | Amin et al. |
| 2014/0171039 A1 | 6/2014 | Bjontegard |
| 2014/0188775 A1 | 7/2014 | Lehmann et al. |
| 2014/0188920 A1* | 7/2014 | Sharma et al. ................ 707/758 |
| 2015/0161554 A1 | 6/2015 | Sweeney et al. |
| 2015/0161564 A1 | 6/2015 | Sweeney et al. |
| 2015/0161697 A1 | 6/2015 | Jones et al. |
| 2015/0271290 A1 | 9/2015 | Tao et al. |
| 2016/0027306 A1 | 1/2016 | Lambert et al. |
| 2016/0298977 A1 | 10/2016 | Newlin et al. |
| 2017/0169535 A1 | 6/2017 | Tolkin et al. |
| 2019/0037355 A1 | 1/2019 | Pao et al. |

FOREIGN PATENT DOCUMENTS

| | | |
|---|---|---|
| KR | 20160102894 A | 8/2016 |
| WO | WO 2011-069170 A1 | 6/2011 |
| WO | WO 2017-052577 A1 | 3/2017 |
| WO | WO 2017-079287 A1 | 5/2017 |

OTHER PUBLICATIONS

U.S. Appl. No. 15/666,446, Oct. 4, 2017, Notice of Allowance.
U.S. Appl. No. 15/842,202, Feb. 27, 2019, Notice of Allowance.
U.S. Appl. No. 16/148,633, Dec. 21, 2018, Notice of Allowance.
U.S. Appl. No. 15/842,202, Oct. 30, 2018, Office Action.
U.S. Appl. No. 15/880,396, May 23, 2018, Notice of Allowance.

* cited by examiner

SYSTEM FOR CONNECTING A DRIVER AND A RIDER

BACKGROUND OF THE INVENTION

Mobile device technology enables people to communicate from any location. However, people still need to move between locations. Even though there are many people driving and there are many people who wish to go to a different location from where they are, the people who wish to go are not typically driven by the many people driving.

BRIEF DESCRIPTION OF THE DRAWINGS

Various embodiments of the invention are disclosed in the following detailed description and the accompanying drawings.

DETAILED DESCRIPTION

Figure 1:
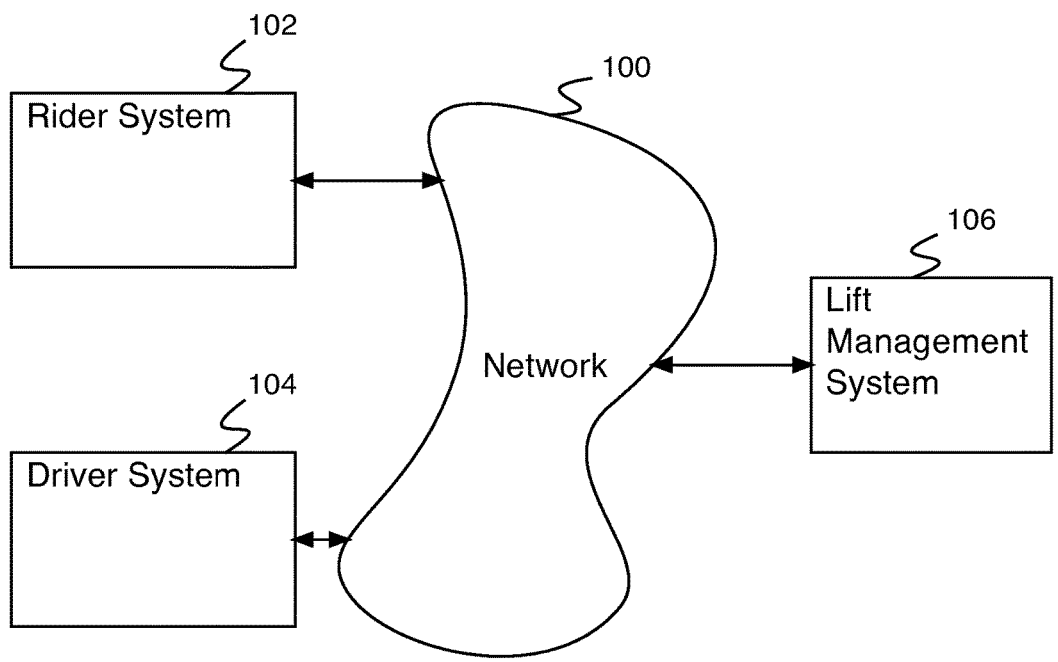
FIG. 1 is a block diagram illustrating an embodiment of a system for connecting a driver and a rider.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for connecting a driver and a rider comprises an interface for providing a display information with potential drivers to the rider; and, in the event that a selected driver accepts the rider, providing a connect notification to the rider; wherein the connect notification comprises: an image associated with the driver, an image associated with the driver's car, and an anonymized interface for contacting the driver. The system for connecting a driver and a rider additionally comprises a processor configured to determine whether the selected driver accepts the rider. In some embodiments, the system for connecting a driver and a rider additionally comprises a memory coupled to the processor and configured to provide the processor with instructions.

A system for connecting a driver and a rider is disclosed. A system for connecting a driver and a rider comprises an app running on a mobile device used by a prospective driver and a prospective rider. In some embodiments, the app comprises a driver mode and a rider mode and can be toggled between the two modes. When a rider starts the app he receives a display of drivers that may be able to give him a ride. The rider can issue a ride request if desired. When the rider issues a ride request, the system provides a notification to a selected driver. In some embodiments, the selected driver has a time limit to respond to the notification. If the driver elects to deny the notification, the notification is provided to a next selected driver. If the driver elects to accept the notification, the driver and the rider are connected. A connection notification is provided to the driver. In some embodiments, the driver receives information regarding the rider (e.g., an image, a specific location for pickup, an anonymized contact number, etc.). A connect notification is provided to the rider. The connect notification comprises images associated with the driver and the driver's car, and an anonymized interface for contacting the driver. In some embodiments, the anonymized interface comprises a button the rider can use to contact the driver via the system for connecting a driver and a rider without revealing any of the driver's personal information to the rider. The driver drives to the location of the rider, picks him/her up, and drives him/her to his/her destination. When the ride is complete, the rider is presented with an interface including a suggested donation for the driver and a driver rating screen. At the end of each day, the driver is presented with a donation summary indicating the total donations received over the course of the day's driving.

FIG. 1 is a block diagram illustrating an embodiment of a system for connecting a driver and a rider. In the example shown, FIG. 1 comprises network 100. In various embodiments, network 100 comprises one or more of the following: a local area network, a wide area network, a wired network, a wireless network, the Internet, an intranet, a storage area network, a cellular network, or any other appropriate communication network. Rider system 102 and driver system 104 comprise user systems (e.g., computing systems for operation by users). In some embodiments, one or more of rider system 102 and driver system 104 comprises a system accessed by a user directly (e.g., the user is in proximity with the user system). In some embodiments, one or more of user system 102 and user system 104 comprises a system accessed by a user remotely (e.g., the user is not in proximity with the user system, and accesses the user system via network 100 and a separate user system). In the example shown, rider system 102 and driver system 104 comprise mobile devices (e.g., smartphones, tablet computers, etc.). Rider system 102 and driver system 104 comprise systems accessing lift management system 106 (e.g., accessing lift management system 106 via network 100). In various embodiments, there are 2, 5, 22, 122, 4320, 26100, or any other appropriate number of user systems (e.g., rider systems and driver systems) accessing lift management system 106. Lift management system 106 comprises a system for managing drivers giving riders lifts. In some embodiments, lift management system 106 comprises a system for connecting a rider and a driver. In some embodiments, lift management system 106 comprises a system for managing rider donations. In some embodiments, lift management system 106 comprises a system for dispatching drivers. In various embodiments, lift management system 106 comprises a computer, a computer with multiple processors, multiple computers connected via a local network, multiple computers connected via a wide area network, multiple computers connected via the Internet, multiple computers connected via network 100, or any other appropriate computing system or systems. In various embodiments, the processors comprising rider system 102, driver system 104, and lift management system 106 comprise any one of a variety of proprietary or commercially available single or multi-processor systems (e.g., an Intel™-based processor) or other type of commercially available processor able to support communications in accordance with each particular embodiment and application.

Figure 2:
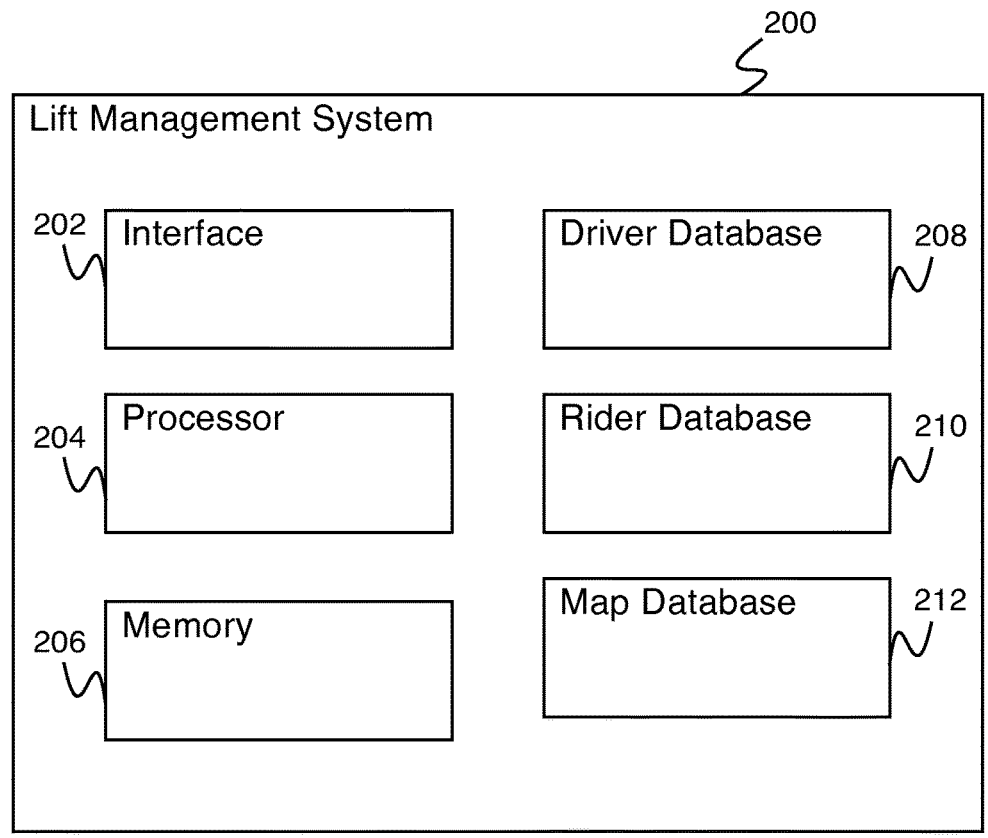
FIG. 2 is a block diagram illustrating an embodiment of a lift management system.

FIG. 2 is a block diagram illustrating an embodiment of a lift management system. In some embodiments, lift management system 200 comprises lift management system 106 of FIG. 1. In the example shown, lift management system 200 comprises interface 202. In various embodiments, interface 202 comprises an interface for receiving ride requests, sending rider notifications, receiving rider accept and deny indications, sending connect notifications, receiving location information, sending and receiving ride start notifications, sending and receiving ride complete notifications, sending and receiving donation information, sending and receiving driver rating information, sending and receiving rider rating information, sending donation summary information, or sending or receiving any other appropriate information. In some embodiments, interface 202 communicates with a user system (e.g., a driver mobile device or a rider mobile device) via a network. Processor 204 comprises a processor for receiving and processing and providing information. In some embodiments, processor 204 communicates with interface 202. Processor 204 receives information from interface 202 and determines what information should be sent by interface 202. In some embodiments, processor 204 determines whether a driver is offered a request from a rider. Memory 206 comprises a memory coupled to processor 204 and configured to provide processor 204 with instructions. Driver database 208 comprises driver information (e.g., driver names, driver schedules, driver histories, driver ratings, driver donation amounts, driver images, driver car images, etc.) Rider database comprises rider information (e.g., rider names, rider histories, rider ratings, rider donation amounts, rider images, etc.). Map database 212 comprises map information. In some embodiments, processor 204 uses map information from map database 212 to plan routes.

Figure 3:
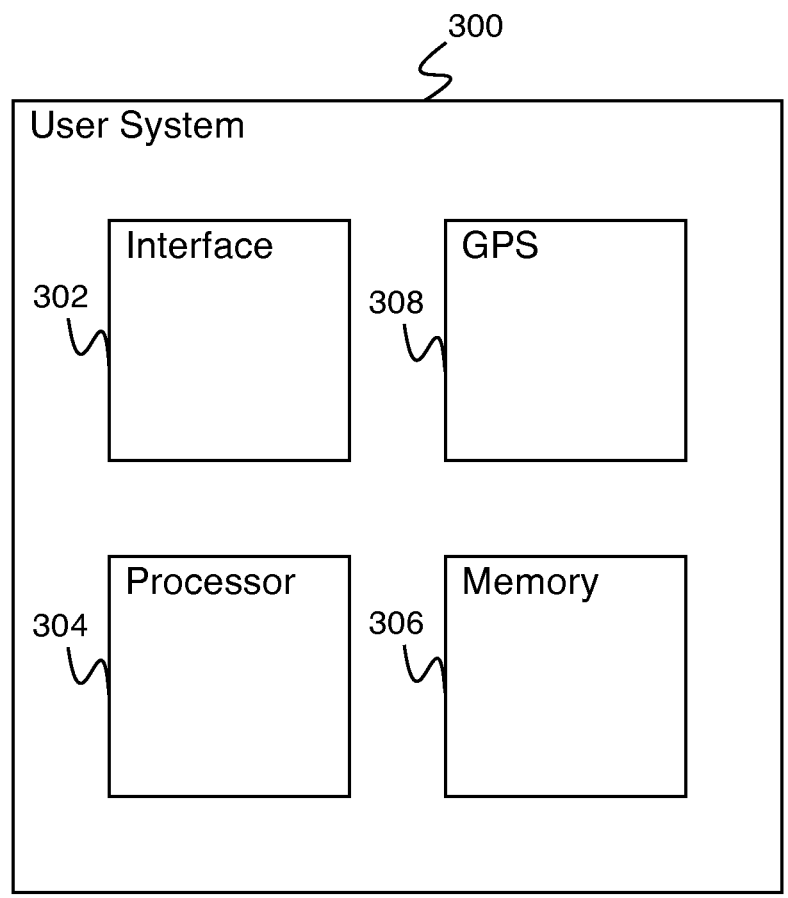
FIG. 3 is a block diagram illustrating an embodiment of a user system.

FIG. 3 is a block diagram illustrating an embodiment of a user system. In some embodiments, user system 300 of FIG. 3 comprises rider system 102 of FIG. 1. In some embodiments, user system 300 of FIG. 3 comprises driver system 104 of FIG. 1. In the example shown, user system 300 comprises interface 302. In various embodiments, interface 302 comprises an interface for sending ride requests, receiving rider notifications, sending rider accept and deny indications, receiving connect notifications, sending location information, sending and receiving ride start notifications, sending and receiving ride complete notifications, sending and receiving donation information, sending and receiving driver rating information, sending and receiving rider rating information, receiving donation summary information, or sending or receiving any other appropriate information. Processor 304 receives information from interface 302 and determines what information should be sent by interface 302. Memory 306 comprises a memory coupled to processor 304 and configured to provide processor 304 with instructions. GPS (e.g., global positioning system) 308 comprises a GPS for determining a user system position. In some embodiments, GPS position information is transmitted by interface 302 to a lift management system.

Figure 4:
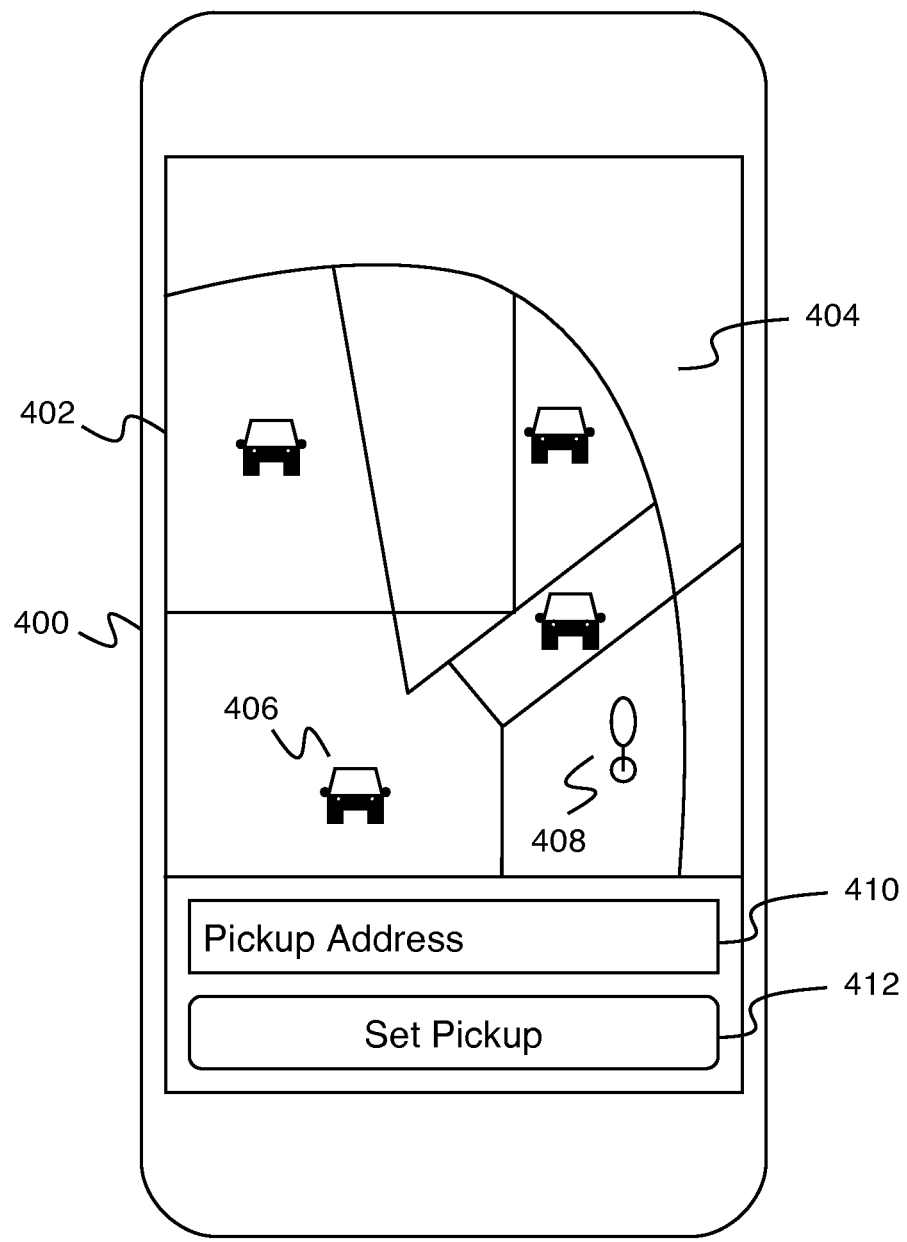
FIG. 4 is a diagram illustrating an embodiment of a user device display for a default display for indicating a pickup address to a rider system.

FIG. 4 is a diagram illustrating an embodiment of a user device display for a default display for indicating a pickup address to a rider system. In some embodiments, the diagram of FIG. 4 illustrates the display of rider system 102 of FIG. 1. In the example shown, rider system 400 comprises display 402. Display 402 comprises a default display for a rider system. Display 402 comprises map 404, displaying the local area around the rider system. Map 404 comprises local roads and geographical features, car icons indicating active driver systems (e.g., car icon 406) and a pin icon indicating the rider system position (e.g., pin icon 408). In some embodiments, the set of car icons indicating active driver systems comprises a set of potential drivers. Display 402 additionally comprises pickup address entry field 410 and set pickup button 412. Pickup address entry field 410 comprises a field for a rider to enter an address to be picked up at. In some embodiments, a rider types a pickup address into pickup address entry field 410. In some embodiments, pickup address entry field 410 defaults to a default pickup address. In some embodiments, the default pickup address is the rider current address. In some embodiments, the default pickup address comprises an address derived from the rider current address (e.g., an address cluster lead location). In some embodiments, the default pickup address comprises a commonly used pickup address. In some embodiments, the rider can access a list of commonly used pickup addresses (e.g., by tapping on pickup address entry field 410, by swiping up on map 404, by tapping on a commonly used addresses button, or by performing any other appropriate user interface action). Set pickup button 412 initiates request of a ride using the currently entered or selected pickup address.

Figure 5:
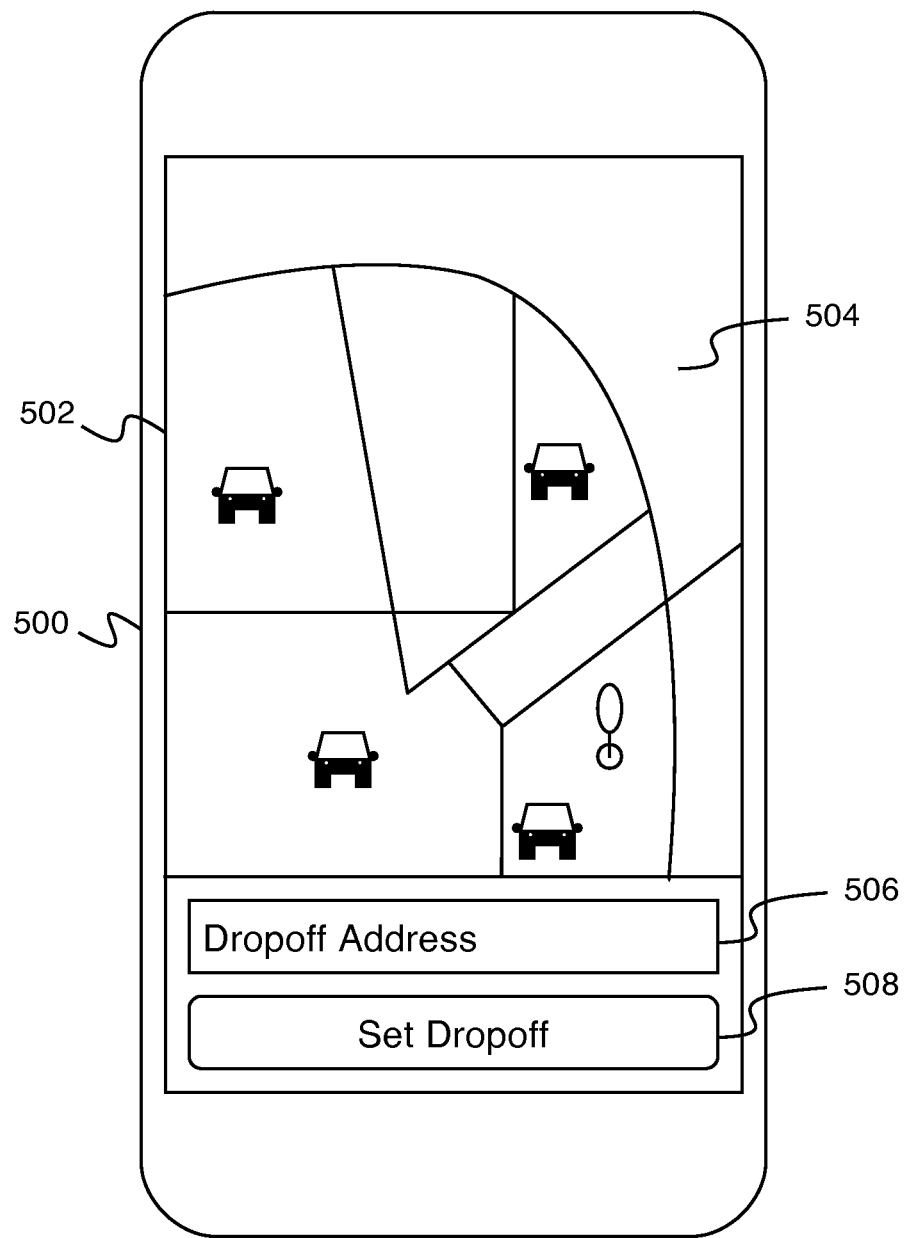
FIG. 5 is a diagram illustrating an embodiment of a user device display for indicating a dropoff address to a rider system.

FIG. 5 is a diagram illustrating an embodiment of a user device display for indicating a dropoff address to a rider system. In some embodiments, the diagram of FIG. 5 illustrates the display of rider system 102 of FIG. 1. In the example shown, rider system 500 comprises display 502. Display 502 comprises a display for a rider system after initiation of a request of a ride with a pickup address (e.g., using set pickup button 412 of FIG. 4). Display 502 comprises map 504, displaying the local area around the rider system. Display 502 additionally comprises dropoff address entry field 506 and set dropoff button 508. Dropoff address entry field 506 comprises a field for a rider to enter an address to be dropped off at. In some embodiments, a rider types a dropoff address into dropoff address entry field 506. In some embodiments, dropoff address entry field 506 defaults to a default dropoff address. In some embodiments, the default pickup address is the rider home address. In some embodiments, the default dropoff address comprises a commonly used dropoff address. In some embodiments, the rider can access a list of commonly used dropoff addresses (e.g., by tapping on dropoff address entry field 506, by swiping up on map 504, by tapping on a commonly used addresses button, or by performing any other appropriate user interface action). Set dropoff button 508 continues request of a ride using the currently entered or selected dropoff address.

In some embodiments, a request for a ride is made without indicating a dropoff address to the rider system, and the dropoff address is indicated by the rider directly to the driver after pickup. In various embodiments, the rider sets a user setting (e.g., on a user settings display) indicating that he does not want to indicate a dropoff addresses, the rider is queried after indicating a pickup address whether he wants to indicate a dropoff address, the rider enters no dropoff address into dropoff address entry field 506, it is determined whether or not a dropoff address is indicated (e.g., entered, not entered, not preferred, preferred, selected, not selected, etc.), or the rider indicates whether or not to indicate a dropoff address in any other appropriate way.

Figure 6:
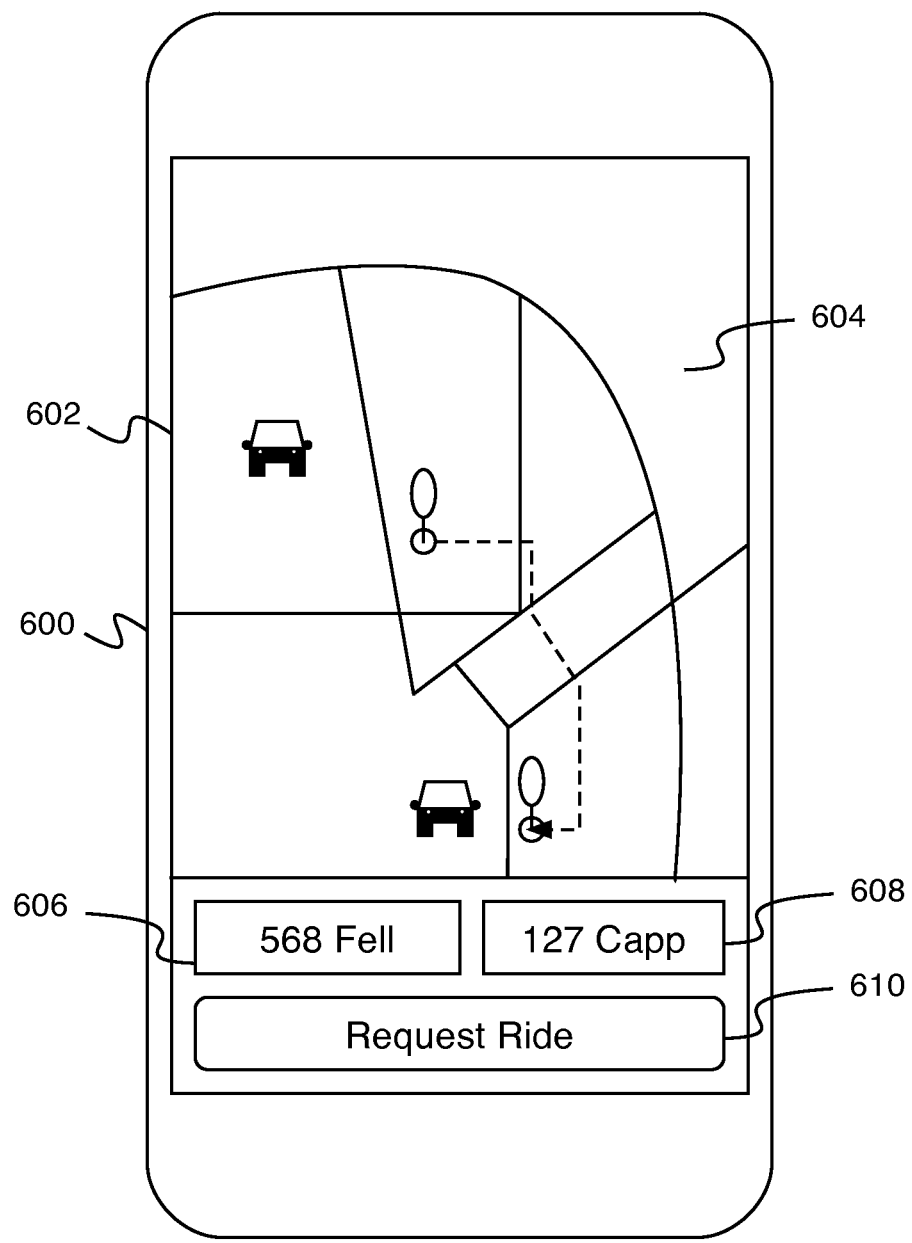
FIG. 6 is a diagram illustrating an embodiment of a user device display for indicating to a rider system to request a ride.

FIG. 6 is a diagram illustrating an embodiment of a user device display for indicating to a rider system to request a ride. In some embodiments, the diagram of FIG. 6 illustrates the display of rider system 102 of FIG. 1. In the example shown, rider system 600 comprises display 602. Display 602 comprises a display for a rider system after indication of a dropoff address for a ride (e.g., using set dropoff button 508 of FIG. 5). In some embodiments, display 602 comprises a display for a rider system after indication of a pickup address for a ride (e.g., using set pickup button 412 of FIG. 2) and indication not to indicate a dropoff address. Display 602 comprises map 604, displaying the local area around the rider system and the path of the ride to be requested. Display 602 additionally comprises pickup address display 606, dropoff address display 608, and request ride button 610. The rider using rider system 600 reviews the path of the ride shown on map 604 and the displayed pickup and dropoff addresses. In some embodiments, the rider can return to the pickup address entry screen, (e.g., shown in FIG. 4) by indicating to pickup address display 606, and the rider can return to the dropoff address entry screen, (e.g., shown in FIG. 5) by indicating to dropoff address display 608. If the user decides the addresses are correct and wants to request the ride, he makes an indication to request ride by activating button 610.

Figure 7:
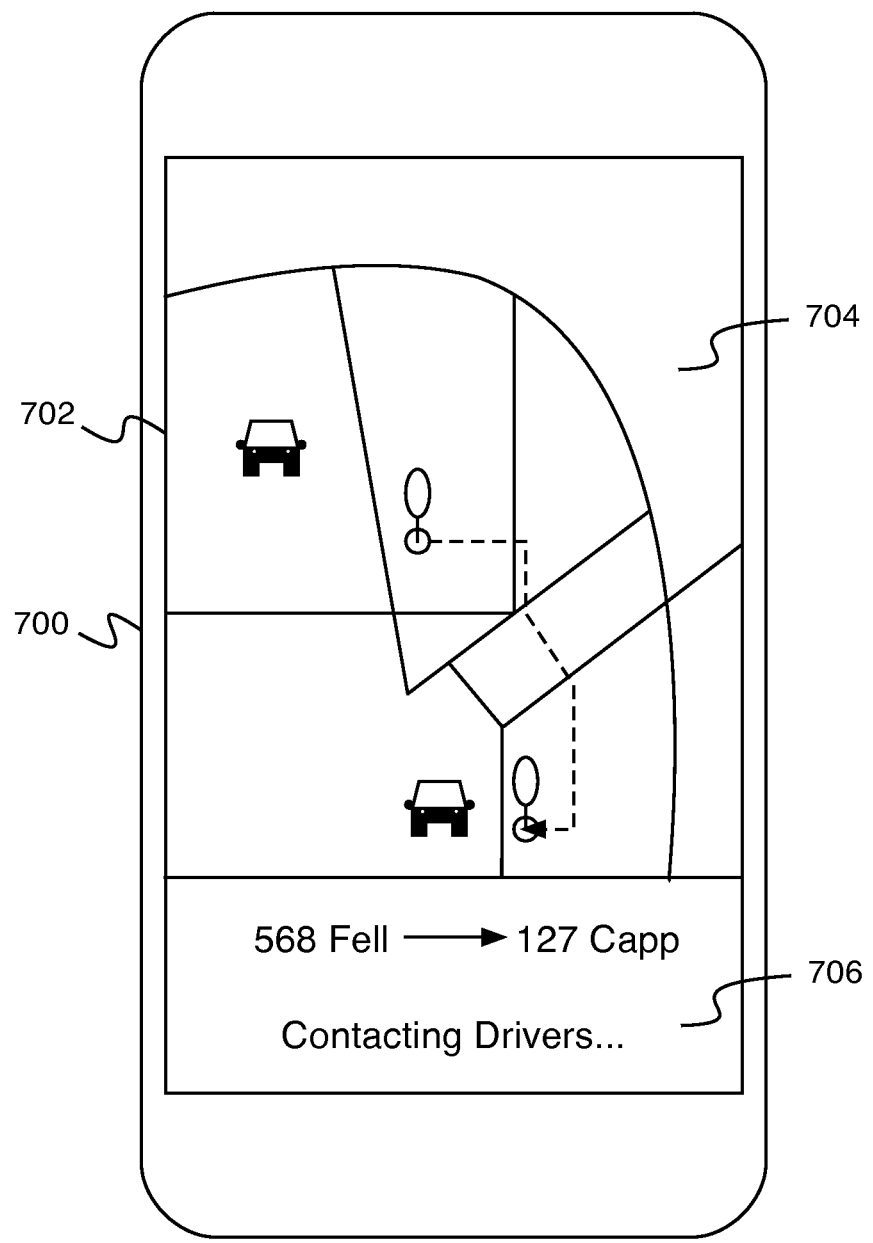
FIG. 7 is a diagram illustrating an embodiment of a user device display for indicating to a rider that drivers are being contacted.

FIG. 7 is a diagram illustrating an embodiment of a user device display for indicating to a rider that drivers are being contacted. In some embodiments, the diagram of FIG. 7 illustrates the display of rider system 102 of FIG. 1. In the example shown, rider system 700 comprises display 702. Display 702 comprises a display for a rider system after indicating to request a ride (e.g., using request ride button 610 of FIG. 6). Display 702 comprises map 704, displaying the local area around the rider system and the path of the requested ride. Display 702 additionally comprises contacting drivers box 706, indicating to the rider the path of the requested ride and that drivers are being contacted. In various embodiments, lift management system receives information from rider system 700 indicating a request for a ride (e.g., pick up address, dropoff address, etc.), determines a driver to request whether the driver will pick up the rider, receives acceptance of the request for picking up the rider, providing driver and rider with acceptance information, receiving ride start and stop information (e.g., start time, stop time, rating, etc.), donation information (e.g., amount donated, summary of donation information, etc.), or any other appropriate system function.

Figure 8:
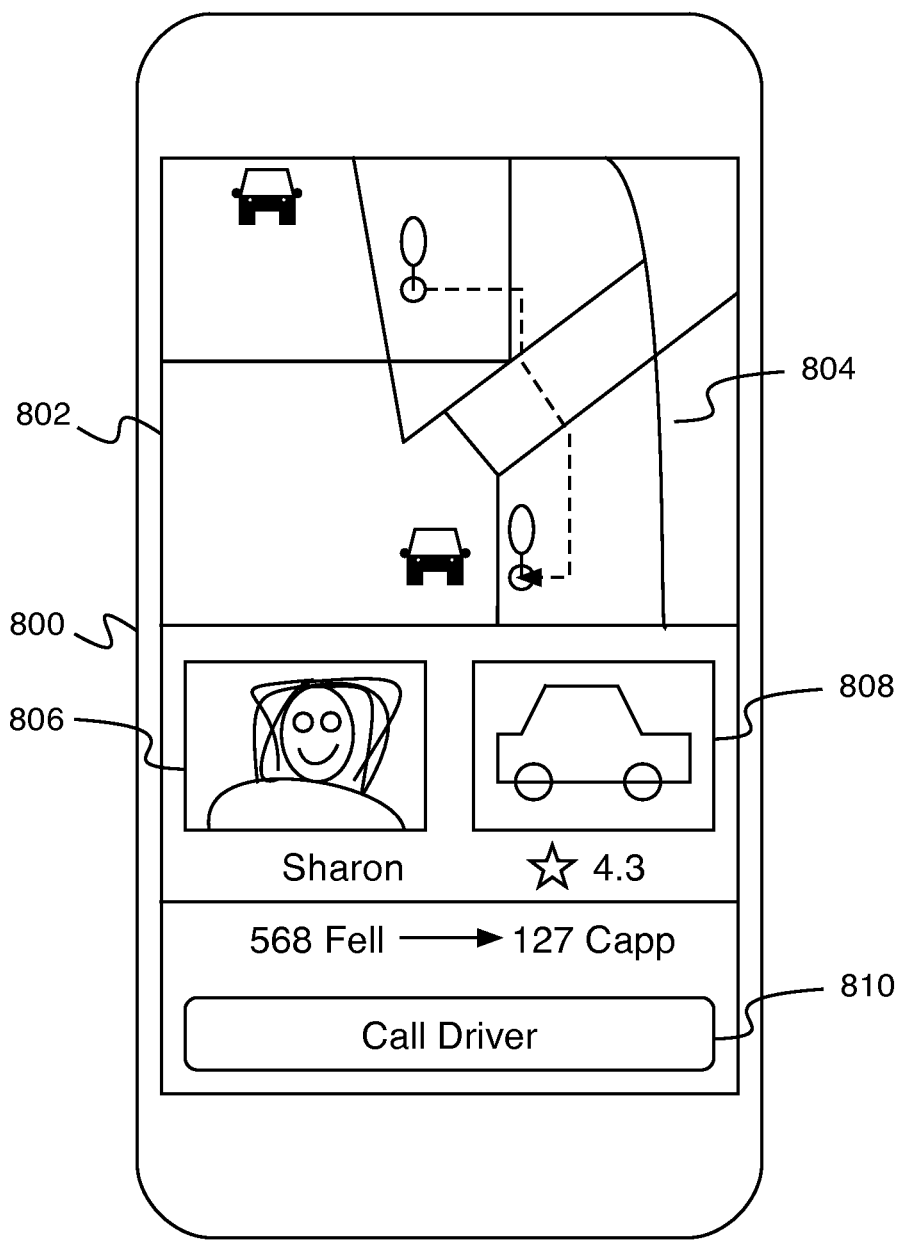
FIG. 8 is a diagram illustrating an embodiment of a user device display for indicating to a rider that a driver has accepted a ride request.

FIG. 8 is a diagram illustrating an embodiment of a user device display for indicating to a rider that a driver has accepted a ride request. In some embodiments, the diagram of FIG. 8 illustrates the display of rider system 102 of FIG. 1. In the example shown, rider system 800 comprises display 802. Display 802 comprises a display for a rider system indicating that a driver has accepted the ride. Display 802 comprises map 804, displaying the local area around the rider system and the path of the ride. Display 802 additionally comprises driver information, including the driver name, driver rating, driver image 806, and driver car image 808. Driver image 806 and driver car image 808 are shown in order that the rider will be better able to identify the driver upon arrival. Display 802 additionally comprises call driver button 810. In some embodiments, when the rider indicates to call by activating driver button 810, an audio connection is made between the rider system and the driver system, enabling the rider and the driver to talk. In some embodiments, call driver button 810 is anonymized, such that none of the driver's information is revealed to the rider (e.g., the driver's phone number), and that after the ride is complete, the rider will no longer be able to contact the driver directly. In some embodiments, none of the rider's information is revealed to the driver (e.g., the rider's phone number), and that after the ride is complete, the driver will no longer be able to contact the rider directly.

After the driver accepts the ride request, the driver drives to the pickup location and meets the rider. Upon arrival at the pickup location, a notification is sent to the rider that the driver has arrived. The rider then boards the driver's car. When the ride starts, the rider receives a ride start notification. In some embodiments, the ride start notification comprises an audio notification. The rider is then taken to the desired destination. In some embodiments, while the ride is underway, the rider is provided with a music playlist for the ride. In some embodiments, while the ride is underway, the driver is provided with a music playlist for the ride enabling the playlist to be played over the vehicle sound system. In some embodiments, while the ride is underway, the driver and/or the rider are provided with a music playlist for the ride. When the destination is reached, the driver indicates that the ride is complete. In various embodiments, the rider and/or the driver are provided with mutually compatible interest information—for example, similar likes, similar work experience, similar other material for interesting conversation topics during the ride, or any other appropriate information. In some embodiments, the interest information is determined by comparing social media web page information (e.g., facebook pages).

Figure 9:
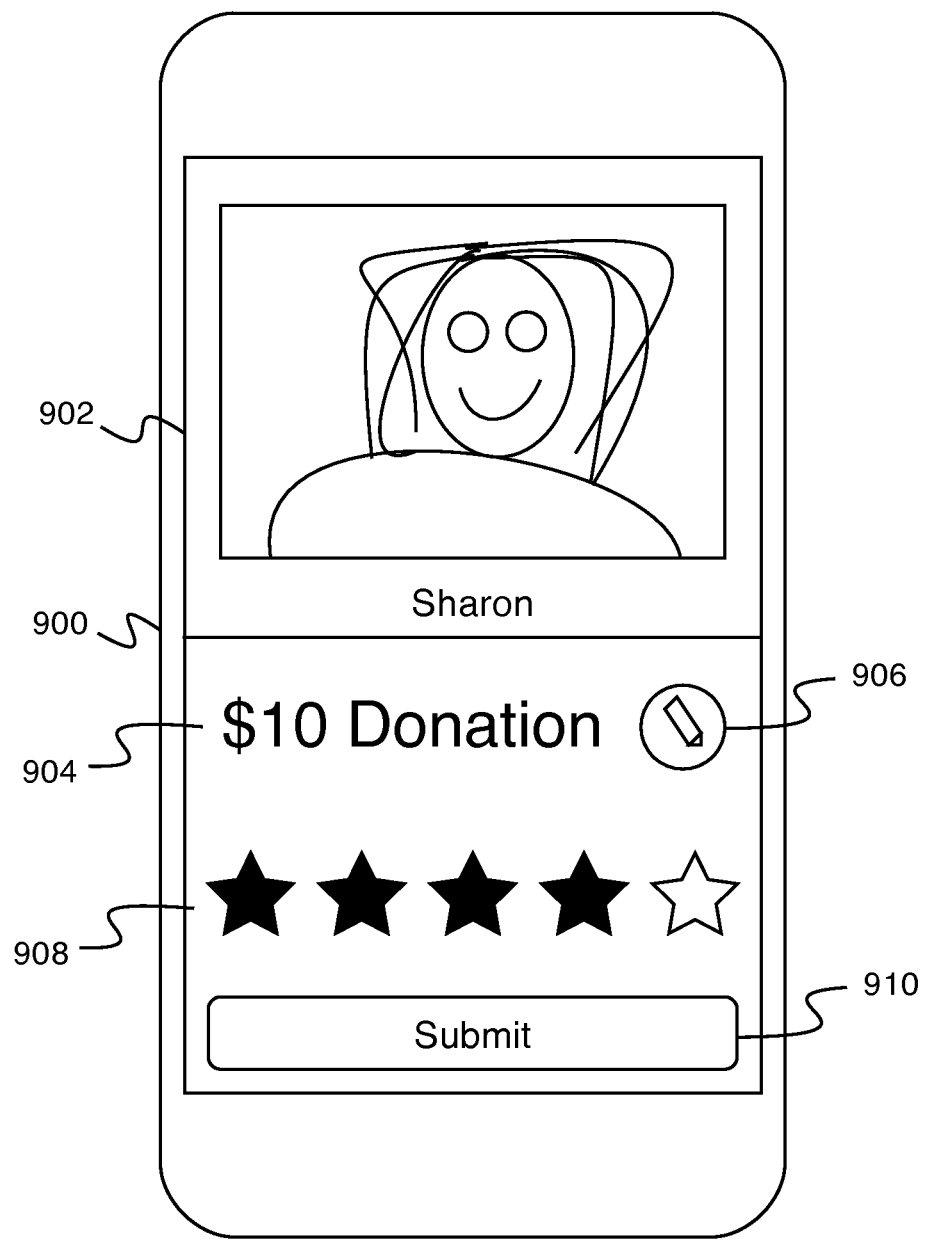
FIG. 9 is a diagram illustrating an embodiment of a user device display for indicating to a rider that the ride is complete.

FIG. 9 is a diagram illustrating an embodiment of a user device display for indicating to a rider that the ride is complete. In some embodiments, the diagram of FIG. 9 illustrates the display of rider system 102 of FIG. 1. In the example shown, rider system 900 comprises display 902. Display 902 comprises a display for a rider system indicating that the ride is complete and the rider should set a driver donation and a driver rating. Display 902 comprises donation amount display 904 and modify donation button 906. In some embodiments, donation amount display initially displays a default donation. In some embodiments, the default donation is determined based on the ride duration, ride distance, and ride region. For example, a suggested donation is $3+$1.75 per mile+$0.40 per minute with a minimum of $6. In another example, a suggested donation is $2+$2.15 per mile+$0.30 per minute with a minimum of $5. In various embodiments, modify donation button 906 allows a rider to modify the donation to any desired amount, a selection of amounts, any amount equal to or above a minimum amount, any amount equal to or lower than a maximum amount, or any other appropriate amount. Driver rating interface 908 comprises a driver rating interface for allowing the rider to rate the driver. When a user has satisfactorily chosen a driver donation and rating, he makes an indication by activating submit button 910 to submit the donation and rating information.

Figure 10:
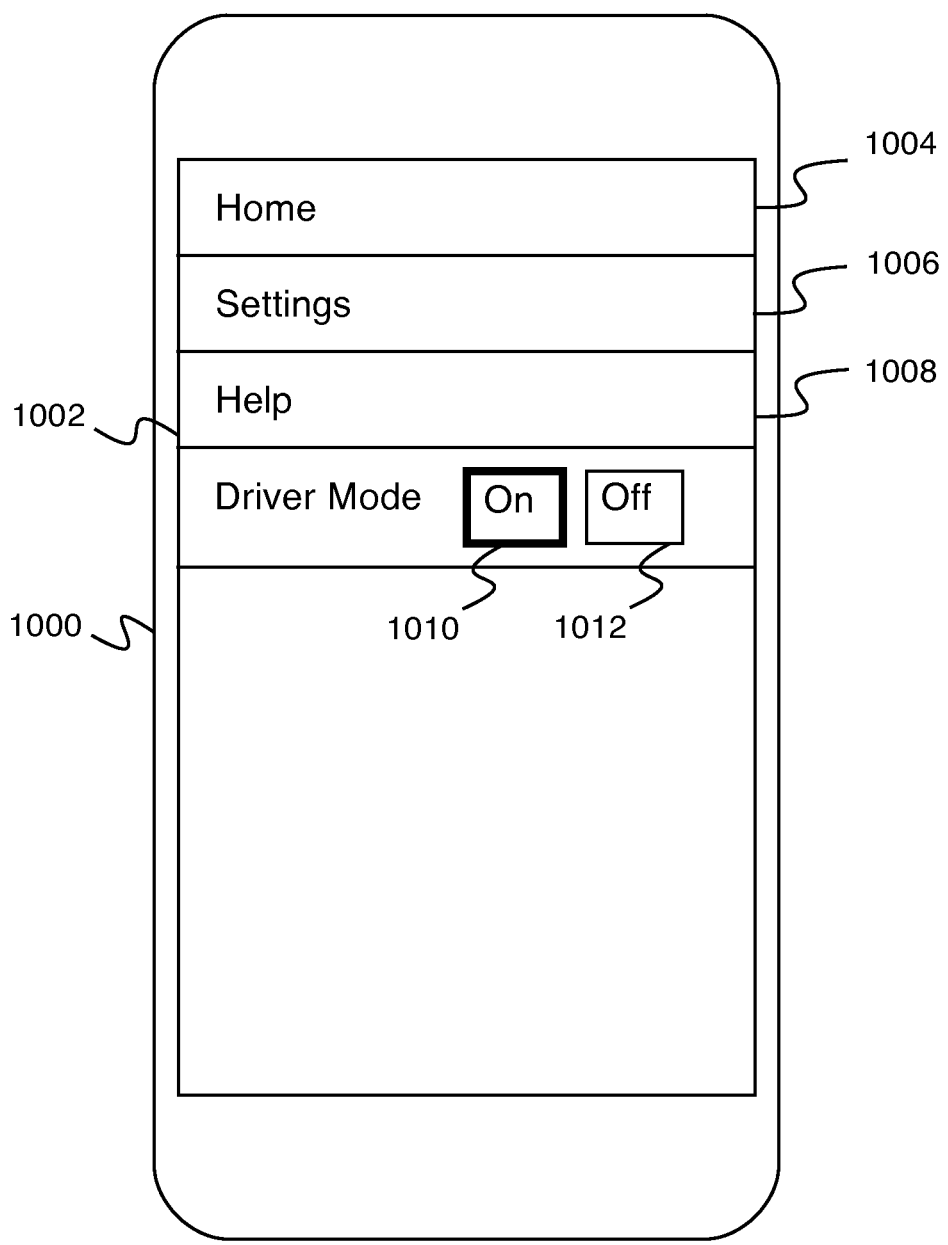
FIG. 10 is a diagram illustrating an embodiment of a user device display for menu options.

FIG. 10 is a diagram illustrating an embodiment of a user device display for menu options. In some embodiments, the diagram of FIG. 10 illustrates the display of rider system 102 of FIG. 1. In some embodiments, the diagram of FIG. 10 illustrates the display of driver system 104 of FIG. 1. In the example shown, user system 1000 comprises display 1002. Display 1002 comprises a display for displaying menu options. In the example shown, menu options comprise home button 1004, settings button 1006, help button 1008, and driver mode on button 1010 and driver mode off button 1012. Home button 1004 brings a user to a home screen. Settings button 1006 brings a user to a settings screen (e.g., a screen that enables a user to set a phone number, an email address, a credit card information, and a coupon information). Help button 1008 brings a user to a help screen. Driver mode on button 1010 turns on driver mode, and driver mode off button 1012 turns off driver mode. In some embodiments, turning off driver mode comprises turning on passenger mode. In various embodiments, driver mode on or off is selected using a pair of buttons, using a sliding switch, using a menu, using radio buttons, or using any other appropriate user interface device. In some embodiments, a user must get prior approval before being allowed to activate driver mode. In some embodiments, a user is not able to see the driver mode switch in the event that the user is not approved for being a driver.

Figure 11:
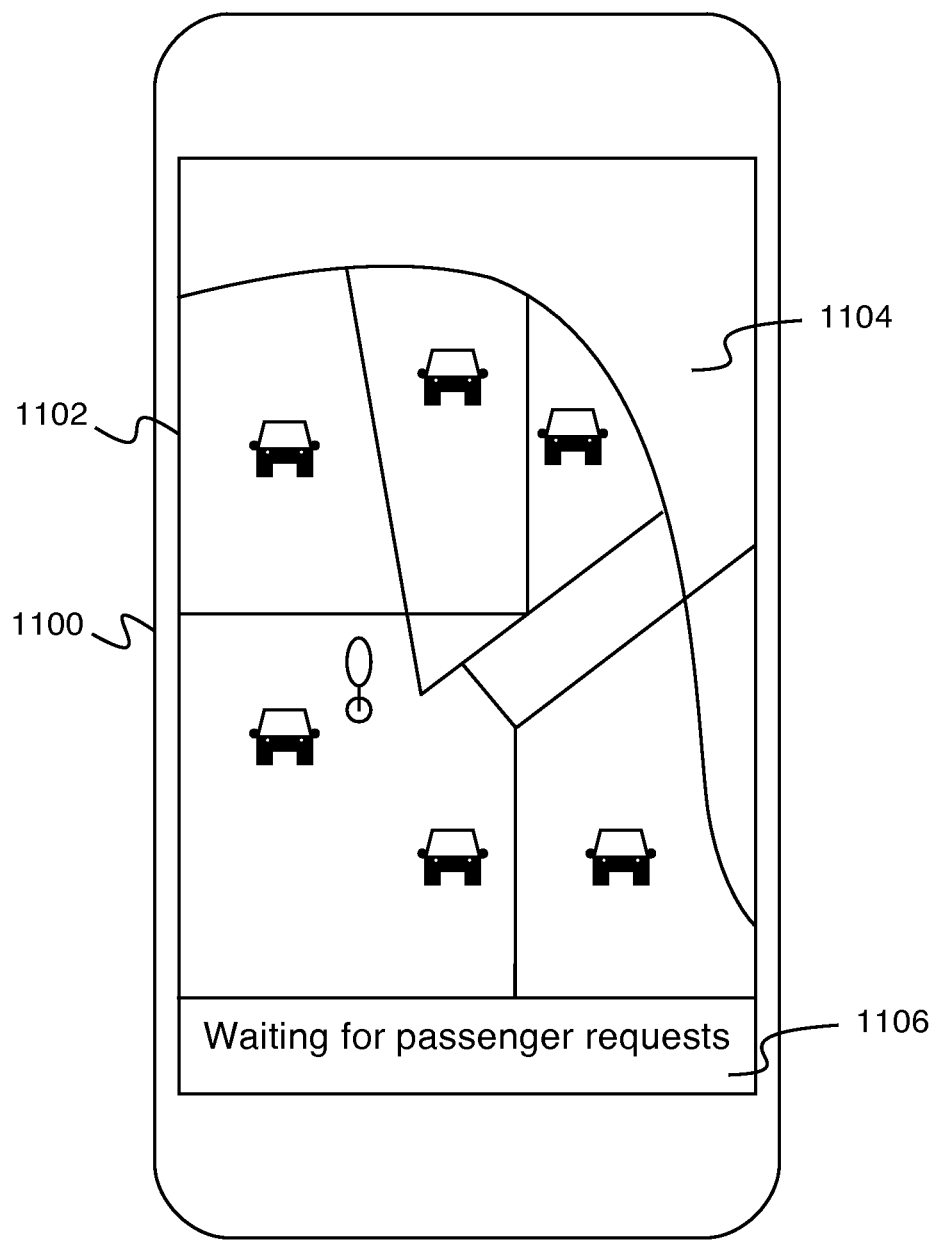
FIG. 11 is a diagram illustrating an embodiment of a user device display for a default display for a driver system.

FIG. 11 is a diagram illustrating an embodiment of a user device display for a default display for a driver system. In some embodiments, the diagram of FIG. 11 illustrates the display of driver system 104 of FIG. 1. In the example shown, driver system 1100 comprises display 1102. Display 1102 comprises a default display for a driver system. Display 1102 comprises map 1104, displaying the local area around the driver system. Map 1104 comprises local roads and geographical features, car icons indicating other active driver systems and a pin icon indicating the driver system position. Display 1102 additionally comprises waiting for passenger requests display 1106, indicating the driver system is waiting for passenger requests. In various embodiments, display 1102 indicates a time since last ride, a probably time to next ride, or any other appropriate information.

Figure 12:
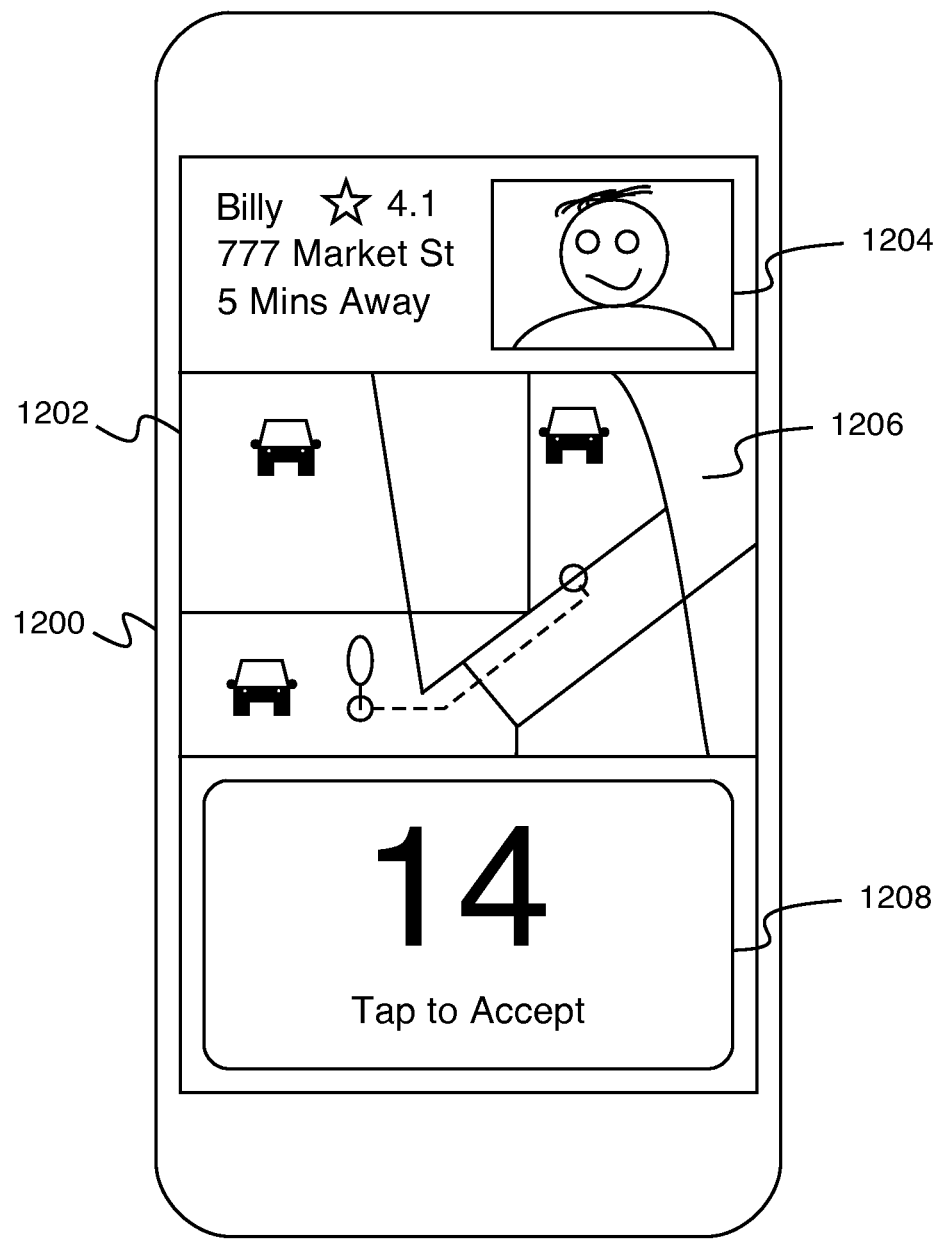
FIG. 12 is a diagram illustrating an embodiment of a user device display for receiving a ride request for a driver system.

FIG. 12 is a diagram illustrating an embodiment of a user device display for receiving a ride request for a driver system. In some embodiments, a ride request comprises a rider notification. In some embodiments, the diagram of FIG. 12 illustrates the display of driver system 104 of FIG. 1. In the example shown, driver system 1200 comprises display 1202. Display 1202 comprises rider information, including a rider name, a rider rating, a rider location and estimated travel time to pick up the rider, and rider photo 1204. Display 1202 comprises map 1206, displaying the local area around the driver system and the path to pick up the rider. Display 1202 additionally comprises accept button 1208. In some embodiments, the ride request comprises a time limit for the driver to accept the ride request. Accept button 1208 displays the remaining time the driver has to accept the ride request. If the driver makes an indication by activating accept button 1208, the driver system registers that the request has been accepted, and the driver and the rider are connected. The driver then begins to drive to pick up the passenger.

In some embodiments, in the event that the driver does not accept the ride request, the ride request is sent to the next selected driver—for example, the lift management system determines a next driver and provides a driver request to the driver. In some embodiments, the next selected driver comprises one of a set of potential drivers. In some embodiments, the driver is informed of a destination (e.g., by displaying the destination on the map or in text).

Figure 13:
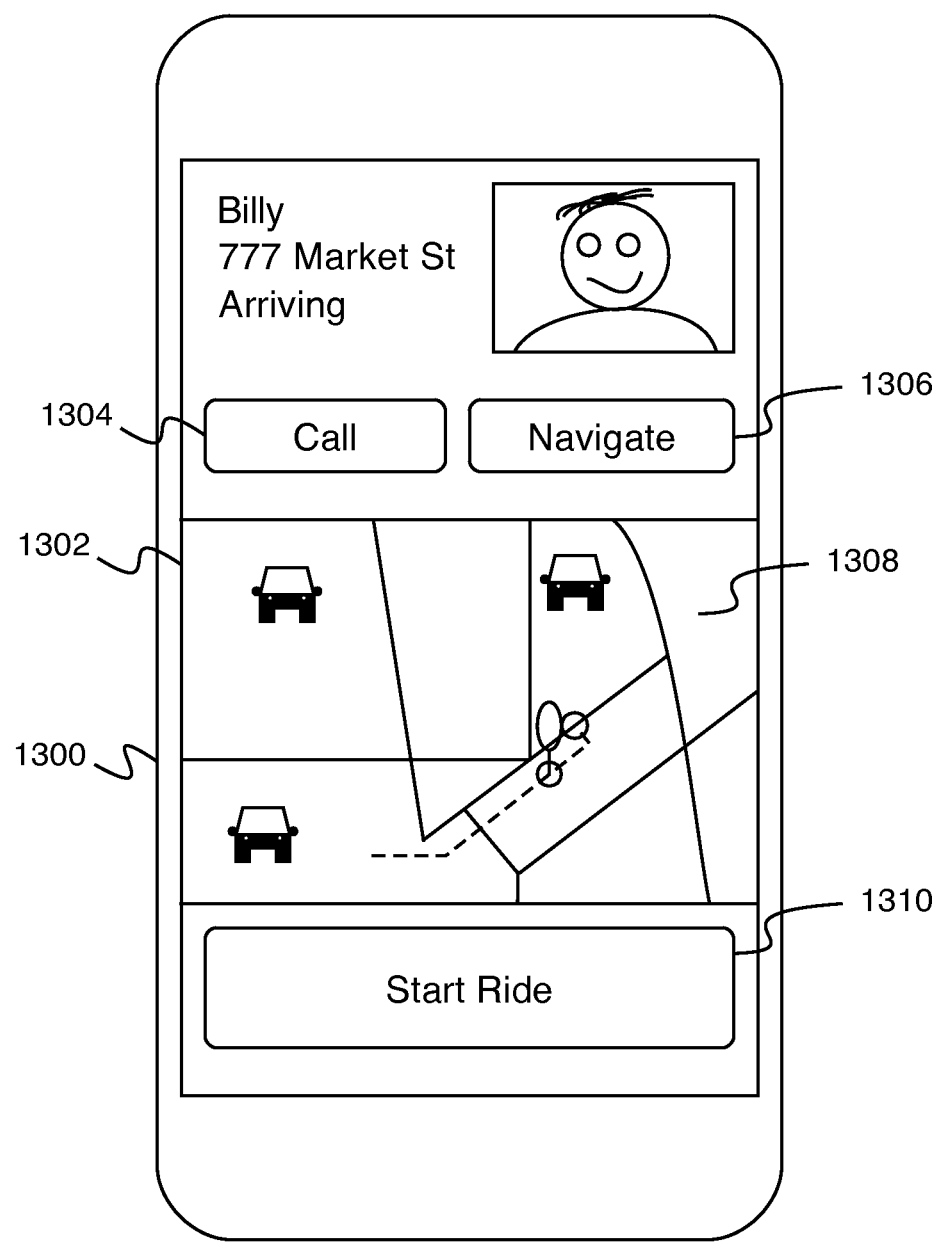
FIG. 13 is a diagram illustrating an embodiment of a user device display for a driver system while driving to pick up a passenger.

FIG. 13 is a diagram illustrating an embodiment of a user device display for a driver system while driving to pick up a passenger. In some embodiments, the diagram of FIG. 13 illustrates the display of driver system 104 of FIG. 1. In the example shown, driver system 1300 comprises display 1302. Display 1302 comprises rider information, call button 1304, and navigate button 1306. In some embodiments, when the driver activates call button 1304 (e.g., taps), an audio connection is made between the driver system and the rider system, enabling the driver and the rider to talk. In some embodiments, call driver button 1304 is anonymized, such that none of the rider's information is revealed to the driver, and that after the ride is complete, the driver will no longer be able to contact the rider directly. When the driver activates navigate button 1306, a set of turn-by-turn directions is shown on display 1302, taking the driver to the rider. Display 1302 additionally comprises map 1308, displaying the local area around the driver system and the driver's progress along the path to pick up the rider. Display 1302 additionally comprises start ride button 1310. After the passenger has boarded the car, the driver indicates to start ride button 1310 to start the ride duration meter. In various embodiments, start ride button 1310 comprises a button, a slider, a switch, or any other appropriate user interface device.

In some embodiments, after the driver activates start ride button 1310 to start the ride duration meter, the driver then drives to the rider destination. When the driver has reached the rider destination, the driver indicates to an end ride button that the ride is complete. In various embodiments, the end ride button comprises a button, a slider, a switch, or any other appropriate user interface device.

Figure 14:
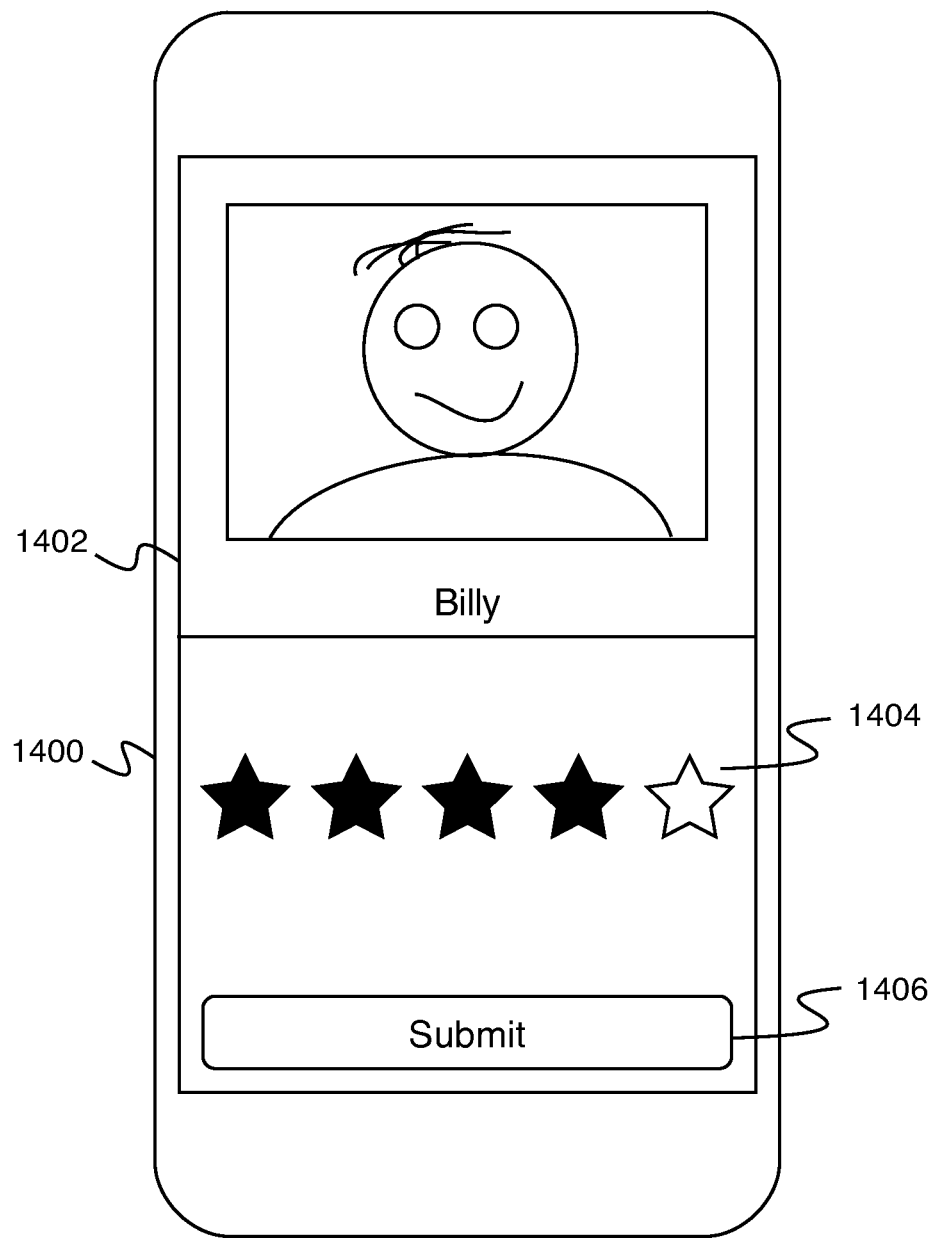
FIG. 14 is a diagram illustrating an embodiment of a user device display for rating a passenger for a driver system.

FIG. 14 is a diagram illustrating an embodiment of a user device display for rating a passenger for a driver system. In some embodiments, the diagram of FIG. 14 illustrates the display of driver system 104 of FIG. 1. In the example shown, driver system 1400 comprises display 1402. Display 1402 comprises rider information, rider rating interface 1404, and submit button 1406. Rider rating interface 1404 comprises a rider rating interface for allowing the driver to rate the rider. When a driver has satisfactorily chosen a rider rating, he makes an indication to submit button 1406 to submit the rating information.

Figure 15:
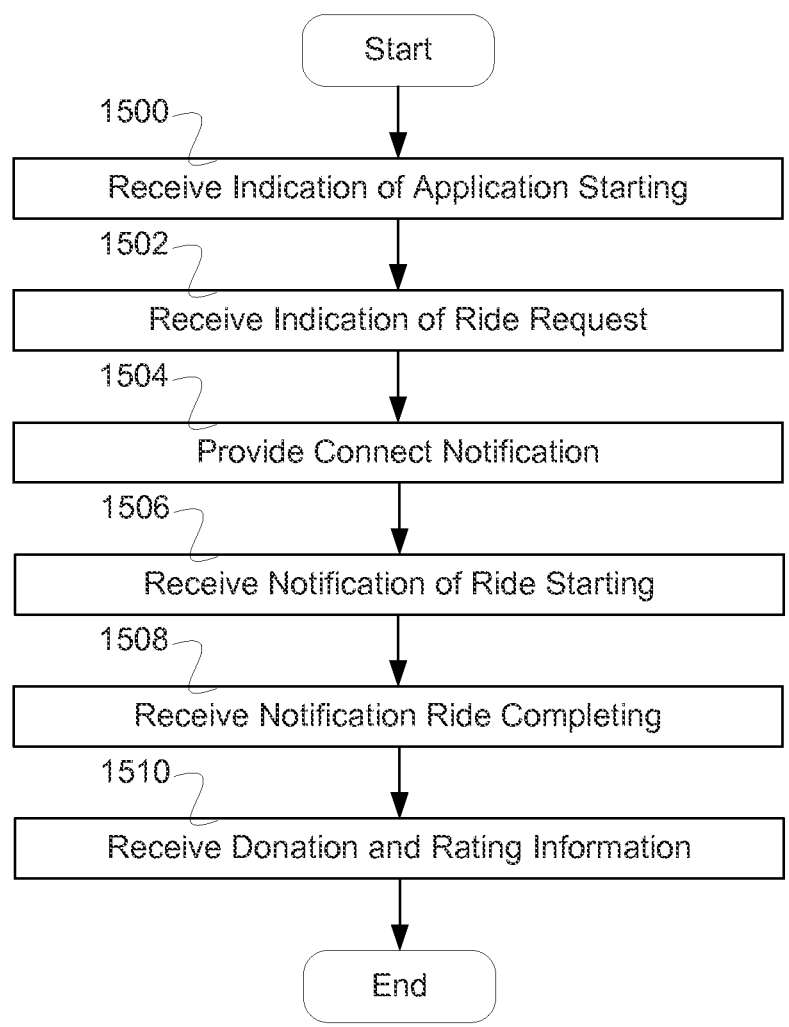
FIG. 15 is a flow diagram illustrating an embodiment of a process for getting a ride.

FIG. 15 is a flow diagram illustrating an embodiment of a process for getting a ride. In some embodiments, the process of FIG. 15 is used by a rider using a rider system (e.g., rider system 102 of FIG. 1) to get a ride using a lift management system (e.g., lift management system 106 of FIG. 1). In 1500, an indication is received of the application starting. For example, the rider starts the ride app and the ride app indicates to the lift management server that it is operating. Information for display is provided to show potential drivers to a rider. In 1502, an indication is received that a ride is requested. For example, the rider requests a ride by indicating in the app and the app provides an indication which is received by the lift management server. In some embodiments, the ride request includes a pickup location. In some embodiments, a ride request includes a dropoff location (e.g., that is typed in as part of the request, as selected from a list, as selected on a map, as selected from a top destination lists, etc.). In some embodiments, the top destination list is for an individual. In 1504, a connect notification is provided. For example, a driver is selected for a requested ride from the rider, the requested ride is provided to the driver, the driver is asked with a time limit whether the requested ride is accepted, and the driver accepts. The driver connection is indicated to the rider. The connect notification indicates that a driver has accepted the ride request. In various embodiments, the connection notification includes one or more of the following: an image of the driver or associated with the driver (e.g., an icon), an image of the driver's car or associated with the driver's car (e.g., an icon), an interface for contacting the driver (e.g., an anonymized contact interface for contacting or calling the driver where the rider does not know the number of the driver and the driver does not know if called the number of the rider), a start location (e.g., a current location of the rider, a lead location—for example, a location associated with the current location but preferred such as a front door of a building based on the a current location inside the building or a corner near by the house instead of in front of the house, etc., a destination, or any other appropriate information. In 1506, a notification is received of the ride starting. For example, the rider meets the driver (e.g., after the driver drives to the rider). The rider boards the vehicle. The rider system provides a notification of the ride starting. In some embodiments, the rider system does not provide an indication of a ride start to the lift system manager. In 1508, a notification is received of the ride completing. For example, the rider rides the vehicle to the destination. The rider system provides notification of the ride complete to the lift management system. In some embodiments, the rider system does not provide an indication of the ride completion to the lift management system. In 1510, donation and rating information is received. For example, the rider exits the vehicle. The rider provides a donation and/or a rating for the ride and this information is provided to the lift management system. The donation is debited from a pre-provided and pre-authorized credit card to the account of the driver. The aggregated total donation for the driver is stored so that it can be provided to the driver at the end of the current shift session or in a summary report.

Figure 16:
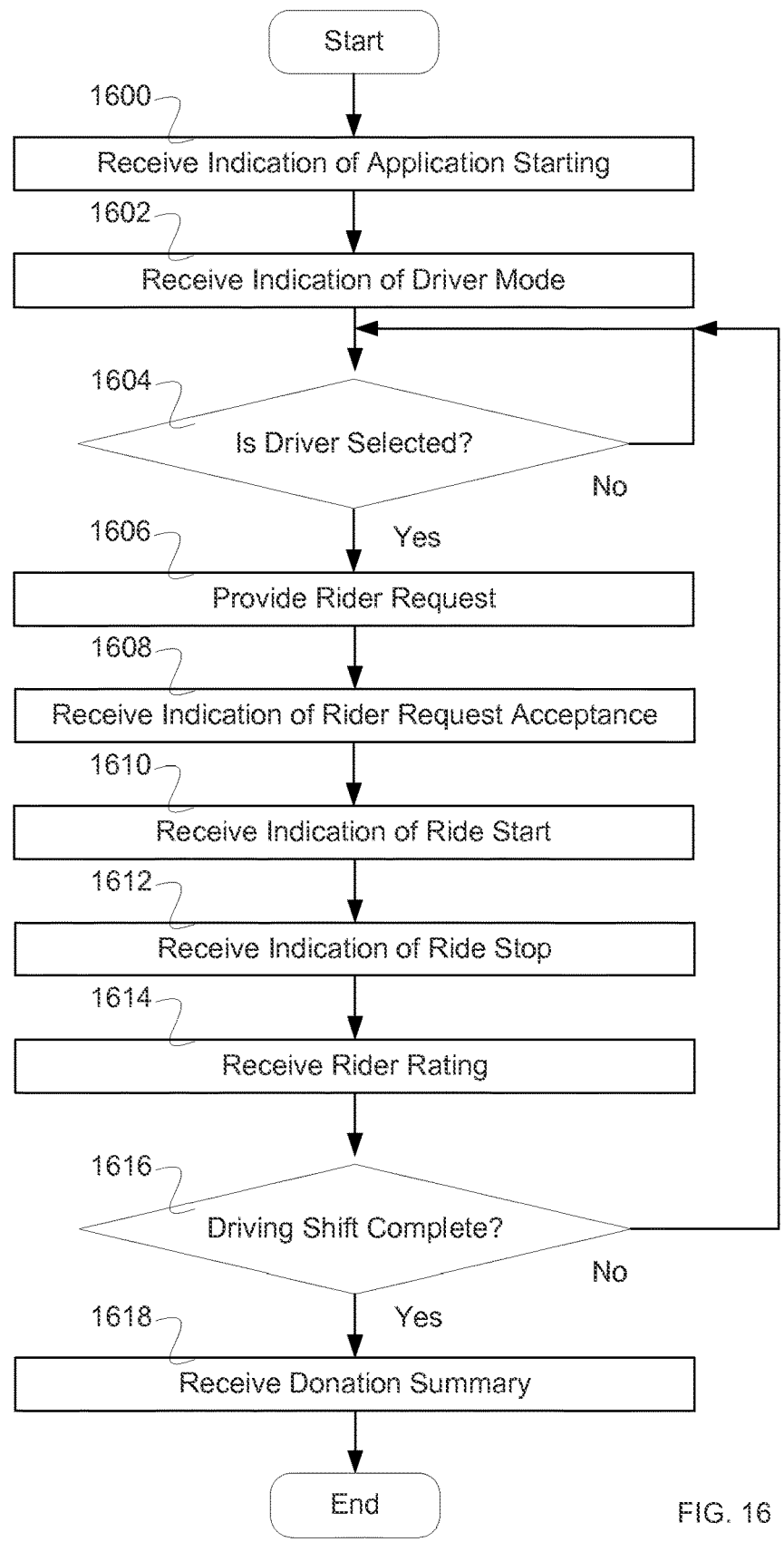
FIG. 16 is a flow diagram illustrating an embodiment of a process for giving a ride.

FIG. 16 is a flow diagram illustrating an embodiment of a process for giving a ride. In some embodiments, the process of FIG. 16 is used by a driver using a driver system (e.g., driver system 104 of FIG. 1) to give a ride using a lift management system (e.g., lift management system 106 of FIG. 1. In 1600, an indication is received of the application starting. For example, the driver starts the ride app. In 1602, an indication is received of being in a driver mode. For example, the driver indicates driver mode to the ride app. The app indicates to the lift management system that the app is in driver mode. A driver waits for a rider, as long as is necessary. In 1604, it is determined whether a driver is selected. In the event that a driver is not selected, control passes to 1604. In the event that a driver is selected, control passes to 1606. In 1606, a rider request is provided. For example, the driver is provided with a rider request. In 1608, an indication is received of the rider request acceptance. For example, the driver indicates acceptance of the rider request to the lift management system. In the event that the driver accepts (e.g., within a time window, the driver accepts), the driver is provided with a connect notification including rider information (e.g., a picture associated with the rider, an interface for anonymized communication, a music playlist, topics for conversation, mutual interests, mutual acquaintances, similarities in job histories, similarities in living locations, similarities in tastes, etc.), a pickup location if not already provided, a destination, if appropriate, or any other appropriate information. In 1610, an indication is received of a ride start. For example, the driver drives to the rider location. The rider then boards the driver vehicle. The driver indicates that the ride has started (e.g., a time of starting a ride and a location of starting a ride), and this is received by the lift management system. In 1612, an indication is received of a ride stop. For example, the driver drives to the rider destination. In some embodiments, the rider destination was entered into the ride request and is received by the ride app. In some embodiments, a destination is selected from a top destination list (e.g., by selecting on a map of top destinations, selecting from a text list, in a history table, etc.). In some embodiments, the rider tells the driver the destination directly. When the destination is reached, the driver indicates the ride is complete and this is indicated to the lift management system (e.g., the stop time, the stop location, etc.). The rider then exits the driver vehicle. In 1614, a rider rating is received. For example, the driver then rates the rider and the rating is transmitted to and received by the lift management system. In 1616, it is determined whether the driving shift is complete. If it is determined that the driving shift is not complete, control passes to 1604. If it is determined that the driving shift is complete, control passes to 1618. In 1618, a donation summary is received. For example, the driver receives a donation summary of all the donations received for the driving shift.

Figure 17:
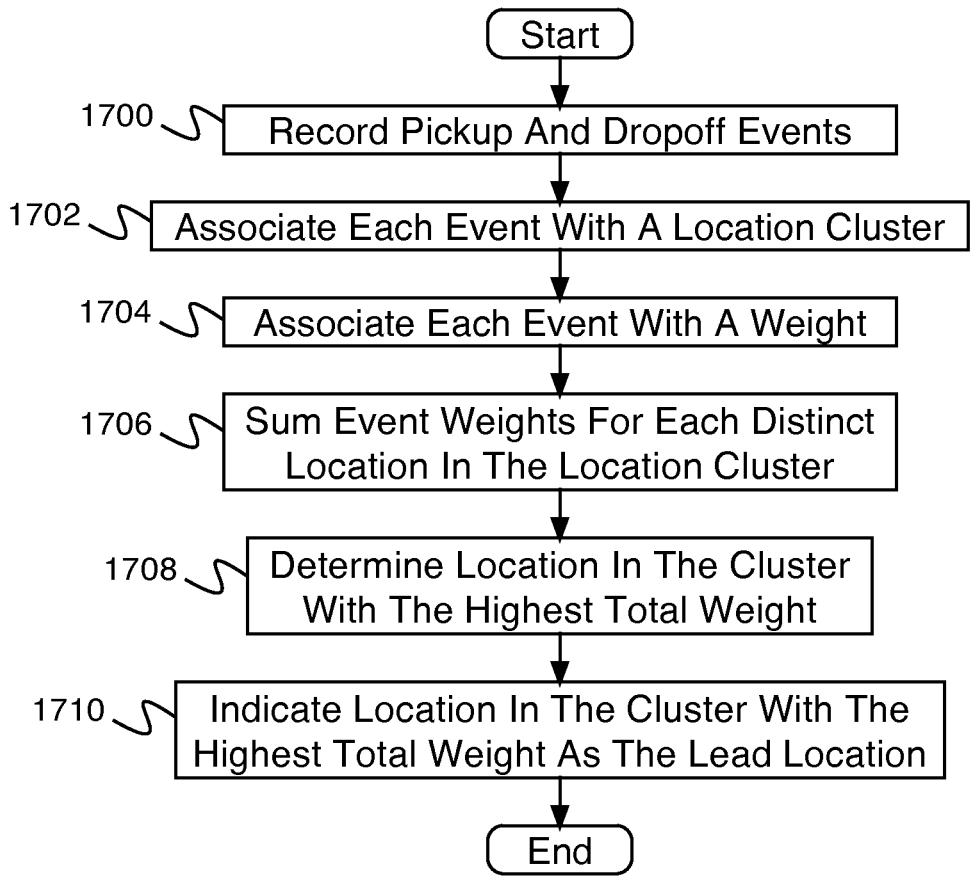
FIG. 17 is a flow diagram illustrating an embodiment of a process for indicating a lead location.

FIG. 17 is a flow diagram illustrating an embodiment of a process for indicating a lead location. In some embodiments, a lead location comprises a location chosen to represent a cluster of nearby locations. For example, if a rider was picked up four times from slightly different locations near the entry to his office, the four pickups would naturally form a cluster, and the office address would more appropriately represent the cluster than the back alley address or the next door address. In 1700, pickup and dropoff events are recorded. Each event comprises a location, a time, a means of entering the location into the app, and any other appropriate information. In 1702, each event is associated with a location cluster. In some embodiments, events are associated with a location cluster using the k-means algorithm. In some embodiments, events are associated with a location cluster by associating them with a set of other events with nearby locations. In 1704, each event is associated with a weight. In some embodiments, the weight is determined by determining the method that was used to enter the location in to the app (e.g., the selector). For example, a typed address (e.g., weighted 1000) is weighted more than moving a pin manually on a map (e.g., weighted 25), which in turn is weighted more than a global positioning location (e.g., weighted 3). In 1706, event weights for each distinct location in the location cluster are summed. For instance, if there are four events in the location cluster with the identical associated locations, their weights are summed and associated with the location. In 1708, the location in the cluster with the highest total weight is determined. In 1710, the location in the cluster with the highest total weight is indicated as the cluster lead location. If a location is entered into the app later that is grouped with the same location cluster, the location will then be represented by the cluster lead location rather than the entered location.

In some embodiments, the addresses are normalized so that a location that a location that has been used multiple times appears only once in the list of addresses for a cluster. Each time someone selects their pick-up or drop-off locations, the method with which they selected that location is stored. We sum up these location selectors per address per cluster. So a cluster would look like the following:
  a. cluster 1
    i. Location A
      1. selector: defaultList
      2. selector: defaultList
      3. selector: typedInput
    ii. Location B
      1. selector: unknown Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A matching system for connecting a driver and a rider, comprising:
  a server computer configured to:
    receive a ride request associated with a requestor computing device of the rider, wherein the ride request includes a pick-up location;
    determine one or more potential start locations located within a predetermined distance from the pick-up location based on pick-up events associated with the requestor computing device;
    determine a weight for each of the one or more potential start locations based on the pick-up events associated with each of the one or more potential start locations, the weight being dependent on a method by which the potential start location was entered into a mobile application for each of the pick-up events, wherein potential start locations with addresses manually entered into the mobile application are weighted more heavily than potential start locations indicated by manual pin placement within the mobile application, and potential start locations indicated by manual pin placement within the mobile application are weighted more heavily than potential start locations determined by GPS information;
    select a start location from the one or more potential start locations based on the weight of each of the one or more potential start locations; and
    cause a provider computing device associated with the driver to display, within a driver interface, the selected start location.

2. The matching system of claim 1, wherein, in the event that the driver associated with the provider computing device does not accept the ride request, an alternate driver is selected and the selected start location is provide to the alternate driver.

3. The matching system of claim 2, wherein information associated with the alternate driver is provided to the requestor computing device of the rider.

4. The matching system of claim 1, wherein the server computer is further configured to receive an indication of a ride start.

5. The matching system of claim 4, wherein the indication of the ride start comprises a ride start time.

6. The matching system of claim 1, wherein the pick-up location is determined based at least in part on a current location of the rider.

7. The matching system of claim 1, wherein the ride request has an associated destination location.

8. The matching system of claim 1, wherein the ride request has an associated time limit for acceptance.

9. The matching system of claim 1, wherein the server computer is further configured to receive an indication of a ride stop.

10. The matching system of claim 1, wherein the server computer is further configured to provide a notification of a completed ride to the requestor computing device.

11. The matching system of claim 1, wherein an address manually entered into the mobile application comprises an addresses typed into an address field.

12. The matching system of claim 1, wherein the pick-up location includes a present location of the requestor computing device, the present location of the requestor computing device being determined by a GPS component of the requestor computing device.

13. The matching system of claim 1, wherein the pick-up location and the selected start location are both associated with a same postal address and wherein the pick-up location and the selected start location are both associated with different geographic locations.

14. The matching system of claim 1, wherein the server computer is configured to determine the one or more potential start locations by:
  determining that the pick-up location is located within a location cluster associated with the pick-up events; and
  identifying the one or more potential start locations from potential start locations associated with the pick-up events in the location cluster.

15. The matching system of claim 1, wherein the server computer is further configured to:
  determine a current location of the provider computing device associated with the driver;
  generate a navigation route from the location of the provider computing device to the selected start location; and
  provide the navigation route to the provider computing device for the ride request.

16. The matching system of claim 1, wherein each of the pick-up events includes a location, a time, and an indicator of the method by which the potential start location was entered into the mobile application.

17. The matching system of claim 1, wherein the method by which the potential start location was entered into the mobile application comprises one or more of an address manually entered into the mobile application, a manual pin placement within the mobile application, or a determined location based on GPS information.

18. The matching system of claim 1, wherein the server computer is further configured to determine weights for location clusters, wherein a location cluster comprises a plurality of nearby locations.

19. The matching system of claim 1, wherein the server computer is further configured to:
   cause the requestor computing device to display the selected start location within a requestor interface, wherein the requestor interface is further modified to present the selected start location instead of the pick-up location.

20. A method for connecting a driver and a rider, comprising:
   receiving, by a matching system, a ride request associated with a requestor computing device of the rider, the ride request including a pick-up location;
   determining one or more potential start locations located within a predetermined distance from the pick-up location based on pick-up events associated with the requestor computing device;
   determining a weight for each of the one or more potential start locations based on the pick-up events associated with each of the one or more potential start locations, the weight being dependent on a method by which the potential start location was entered into a mobile application for each of the pick-up events, wherein potential start locations with addresses manually entered into the mobile application are weighted more heavily than potential start locations indicated by manual pin placement within the mobile application, and potential start locations indicated by manual pin placement within the mobile application are weighted more heavily than potential start locations determined by GPS information;
   selecting a start location from the one or more potential start locations based on the weight of each of the one or more potential start locations; and
   causing, by the matching system, a provider computing device associated with the driver to display, within a driver interface, the selected start location.

21. A computer program product for connecting a driver and a rider, the computer program product being embodied in a tangible non-transitory computer readable storage medium and comprising computer instructions for:
   receiving a ride request associated with a requestor computing device of the rider, the ride request including a pick-up location;
   determining one or more potential start locations located within a predetermined distance from the pick-up location based on pick-up events associated with the requestor computing device;
   determining a weight for each of the one or more potential start locations based on the pick-up events associated with each of the one or more potential start locations, the weight being dependent on a method by which the potential start location was entered into a mobile application for each of the pick-up events, wherein potential start locations with addresses manually entered into the mobile application are weighted more heavily than potential start locations indicated by manual pin placement within the mobile application, and potential start locations indicated by manual pin placement within the mobile application are weighted more heavily than potential start locations determined by GPS information;
   selecting a start location from the one or more potential start locations based on the weight of each of the one or more potential start locations; and
   causing a provider computing device associated with the driver to display, within a driver interface, the selected start location.

* * * * *